(12) United States Patent
Shimizu et al.

(10) Patent No.: US 6,724,164 B2
(45) Date of Patent: Apr. 20, 2004

(54) OPENING-AND-CLOSING MEMBER CONTROL DEVICE

(75) Inventors: Keiichi Shimizu, Kasugai (JP); Yasuhide Tanaka, Owariasahi (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/464,241

(22) Filed: Jun. 18, 2003

(65) Prior Publication Data

US 2004/0004454 A1 Jan. 8, 2004

(30) Foreign Application Priority Data

Jul. 2, 2002 (JP) ........................................ 2002-193556

(51) Int. Cl.[7] .............................................. H02P 1/22
(52) U.S. Cl. .................... 318/282; 318/280; 318/265; 49/26; 49/28
(58) Field of Search ................................ 318/280, 282, 318/265; 49/28, 26

(56) References Cited

U.S. PATENT DOCUMENTS 4,575,662 A * 3/1986 Lehnhoff .................... 318/282
6,222,709 B1 * 4/2001 Baba ............................ 361/18
6,366,040 B1 * 4/2002 McLennan et al. ......... 318/280
6,369,556 B1 * 4/2002 Ohshima ..................... 323/282

FOREIGN PATENT DOCUMENTS

JP           7-146308           6/1995       ........... G01P/21/00

\* cited by examiner

*Primary Examiner*—Rita Leykin
(74) *Attorney, Agent, or Firm*—Rosenthal & Osha L.L.P.

(57) ABSTRACT

A power-window control device is provided which is capable of inexpensively avoiding the occurrence of a failure, not to overlook in safety, due to a short-circuit (including current leak) at between adjacent ones of switch terminals. The switch terminals are arranged in a combination that the terminals having a possibility to cause a failure due to short-circuit are not in an adjacent relationship. Specifically, in the case of a configuration of FIG. 1, arrangement is made such that there is no adjacent relationship between the MU and the COMA, the MD and the COMA, the NC and the COMA, the NC and the NO, the NC and the COMS, the NO and the COMA, the NO and the COMS, and the COMA and the COMS, e.g. in an order of the COMS, MD, NO, AD, COMA, AU, NC and MU.

5 Claims, 6 Drawing Sheets

FIG. 6A

| TERMINAL NAME | MU | MD | AU | AD | COMA | NC | NO | COMS |
|---|---|---|---|---|---|---|---|---|
| MU | | | | | ① | | | |
| MD | | | | | ① | | | |
| AU | | | | | | | | |
| AD | | | | | | | | |
| COMA | ① | ① | | | | ②③ | ① | ③ |
| NC | | | | | ②③ | | ②③④ | ②④ |
| NO | | | | | ① | ②③④ | | ③ |
| COMS | | | | | ③ | ②④ | ③ | |

FIG. 6B

| TERMINAL NAME | MU | MD | COMB | AU | AD | COMA |
|---|---|---|---|---|---|---|
| MU | | | ① | ① | ① | |
| MD | | | ① | ① | ① | |
| COMB | ① | ① | | | | ② |
| AU | ① | ① | | | | |
| AD | ① | ① | | | | |
| COMA | | | ② | | | |

OPENING-AND-CLOSING MEMBER CONTROL DEVICE

BACKGROUND OF THE INVENTION

1. Field of the Invention

The present invention relates to an opening-and-closing member control device for controlling a motor to open and close a vehicular power window, and more particularly to an opening-and-closing member control device that the failure by short-circuit (including current leak), not to be overlook, can be avoided from occurring at between adjacent ones of switch terminals.

2. Description of the Related Art

In controlling an opening-and-closing member as in a vehicular power window (controlling at least the driver's seat window), the mainstream is on the electronic control that realizes window auto operation (operation that the window automatically moves to the full closure or open position even if the user quits manipulation), auto-reverse operation during a detection of catching in. It is a general practice to use a relay-based driving scheme, as an opening-and-closing member control device that appropriately supplies power to a driving source motor and controls the operation thereof.

Namely, the opening-and-closing control device of this kind has two small-sized relays (those having what is called 1c contacts) for supplying power to the motor and driving the motor toward opening (toward opening the window) or toward closing (toward closing the window), a small-sized switch for generating an operation signal (terminal voltage) instructing motor operation (opening-and-closing member operation) responsive to user's manipulation, and a control circuit for driving any of the relays depending upon an operating state of the switch (voltage change on the terminal due to internal contact operation). The device, in a state these elements are densely mounted on one board, is set up in a slight unoccupied space, such as vehicular door interior (in a backside of the window operating part).

Herein, the relays having 1c-contacts are each made up with an excitation coil and a contact having a common terminal (hereinafter, referred to as C terminal), a normally open terminal (hereinafter, referred to as N.O terminal) and normally closed terminal (hereinafter, referred to as N.C terminal). In a non-operating state the coil is not energized, the C terminal and the N.C terminal are in a state connected together while, in an operating state the coil is energized, the C terminal and the N.O terminal are in a state connected together. Usually, the N.O terminal of the relay is connected to a high-potential end of a power line (e.g. part applied by a battery output voltage of approximately 12 V), and the N.C terminal is connected to a ground end (a low potential end of the power source, usually connected to the earth). Meanwhile, the C terminal of the opening-sided relay, when connected to the high potential end, is connected to the terminal, on a side rotating the motor toward opening, of the both motor coil terminals of the motor. On the other hand, the C terminal of the closing-sided relay, when connected to the high potential end, is connected to the terminal, on a side rotating the motor toward closing, of the both motor coil terminals of the motor.

Meanwhile, the switch is generally structured in a module that a plurality of contacts are incorporated in a small case having a length of approximately 2 cm so that the terminal connection ends of the contacts project at a mounting surface of the case, i.e. a small-sized component mountable on a circuit board. In carrying out an auto operation, there are provided two normally open contacts for instructing a usual opening or closing (what is called manual operation the opening-and-closing member is to move only during user's operation) and two normally open contacts for instructing an auto operation toward operating or closing, so that these contact can turn on responsive to the operation, for example, of the operating part (e.g. swing knob) provided on an inner surface of vehicular door. For example, when the operating part is operated a predetermined amount toward closing the window, the normally open contact for instructing a closure turns on. Furthermore, the operating part is further operated in the same direction beyond the predetermined amount, the normally open contact also turns on that instructs an auto operation toward closure. In case the contact turns on, one terminal (output terminal) of the contact is connected to the other terminal (common terminal) whereby, in contrivance, the voltage at the output terminal varies from a high potential (power potential) to a low potential (ground-ended potential) and read out by a control circuit.

In the control circuit, the change of terminal voltage is read by a built-in microcomputer to determine which contact of the switch has turned on (i.e., what operating instruction has been inputted) (hereinafter, referred to as operation determination). Depending on a result of the determination, the relay is energized under control of the microcomputer, thereby operating the motor. For example, in case of a determination that the normally open contact for instructing a usual closure is on, only a closing-sided relay is energized to connect one terminal of the motor to the power line thereby realizing a manual operation the motor is operated toward closure only when the normally open contact is on. Also, when determining further a turning on of the normally open contact for instructing an auto operation toward closure, even unless thereafter the operation determination is made, the closing-sided relay is continued driven to operate the motor toward closure (i.e. carrying out an auto operation toward closure) until determining a state of full open or catching in is entered. Incidentally, the determination of a full closure, full opening or catching a foreign matter is made based on an output of a Hall sensor incorporated in the motor that detects a moving position of a window glass or on a detected motor current value.

In the meanwhile, in the opening-and-closing control device as described above, the signal current to be inputted from the switch to the control circuit is as slight as approximately 10–100 mA. Furthermore, the interval of switch terminals is approximately 2 mm and the interval of lands for connecting the terminals to a board is approximately 0.6 mm. Should a foreign matter (what is called solder balls, moistened should dust, water drip due to dew, or the like) is put to between the adjacent ones of the terminals of the switch or the conductors in conduction to those (e.g. the lands on the board), there is a fear, not to overlook, of causing a failure by a slight short-circuit current due to the foreign matter, as in the following.

Namely, there is a possibility to cause an unintentional operation in the absence of user's operation (failure mode 1), a fumigant combustion resulting from a tracking phenomenon (phenomenon forming an electric path due to carbonization in an insulating part) due to leakage at the high voltage line (e.g. 12-V line) and ground side (failure mode 2), an unintentional operation in the absence of user's operation during a water flood (failure mode 3), or impossible opening despite user's operation toward opening during a water flood (failure mode 4).

Consequently, it is the conventional practice to carry out secondary working, e.g. coating with an insulating material after switch assembling or mounting in order not to expose the conductor surface such as the terminal, or to implement especial production control not to cause solder balls. However, such secondary working forms a factor to raise mount-up of cost. Incidentally, in case the secondary working is abolished in order for cost reduction, such a problem is encountered that a sufficient margin cannot be secured for required performance (reliability not to cause the above failure mode). Therefore, it is an object of the present invention to provide an opening-and-closing member control device capable of inexpensively avoiding the occurrence of a failure, not to overlook in safety, due to a short-circuit (including current leak) at between adjacent switch terminals.

SUMMARY OF THE INVENTION

An opening-and-closing member control device of a first embodiment of the present invention is an opening-and-closing member control device having a contact for opening and closing an energizing line to a motor for driving an opening-and-closing member in a vehicle, to have two relays for operating the motor in a direction toward opening or closing the opening-and-closing member during operation, a switch to be operated by a manipulation of a vehicular user, and a control circuit for driving any of the relays depending upon an operation state of the switch, wherein, the switch comprises:
  a first common terminal (COMA) connected to a ground;
  a closing signal terminal (MU) to be conducted to the first common terminal by an operation instructing for closing the opening-and-closing member and turned from a plus potential into a ground potential;
  an opening signal terminal to be conducted to the first common terminal (MD) by an operation instructing for opening the opening-and-closing member and turned from a plus potential into the ground potential;
  an auto-closing signal terminal (AU) to be conducted to the first common terminal by an operation instructing for auto-full-closing operation of the opening-and-closing member and turned from a plus potential into the ground potential; and
  an auto-opening signal terminal (AD) to be conducted to the first common terminal by an operation instructing for auto-full-opening operation of the opening-and-closing member and turned from a plus potential into the ground potential;
the control circuit has functions of:
  driving a closing-sided relay when the closing signal terminal is at the ground potential, and driving an opening-sided relay when the opening signal terminal is at the ground potential;
  continuously driving the closing-sided relay until the opening-and-closing member is detected as in a full closed state or a foreign-matter-catching state when the closing signal terminal and the auto closing signal terminal become the ground potential; and
  continuously driving the open-sided relay until the opening-and-closing member is detected as in a full opened state when the opening signal terminal and the auto opening signal terminal become the ground potential;
  wherein arrangement is made such that the closing signal terminal (MU) and the first common terminal (COMA) as well as the opening signal terminal (MD) and the first common terminal (COMA) are not in adjacent relationships.

Herein, "such that . . . not in adjacent relationships" means not to be in an adjacent relationship at a narrow spacing to possibly cause short-circuit by a foreign matter having possible adhesion. Also, "ground" means a lower potential end of a power source, not necessarily requiring a grounding. Also, "ground potential" means a potential of a power source at a lower potential end, including what is called a low-level potential equal to or lower than a threshold for determining a voltage as a signal. Similarly, "plus potential" means a potential of a power source at a higher potential end, including what is called a high-level potential equal to or higher than a threshold for determining a voltage as a signal.

According to the invention, what is called manual operation and auto operation is possible for the opening-and-closing member. Furthermore, should a conductive foreign matter is put between the adjacent ones of the terminals of the switch or the conductors in conduction to these (e.g. terminal-connecting lands on the board), the foregoing faulty modes do not occur. This is because, in the control device having the above configuration, there is only a possibility to cause failure mode 1 due to a short-circuit between the MU and the COMA, and between the MD and the COMA. Accordingly, in case arrangement is made with such a combination of terminals not in an adjacent relationship, the foregoing failure modes can be avoided from occurring with sufficient reliability.

Incidentally, in a preferable form of the invention, the switch further comprises a second common terminal (COMS) and normally closed terminal (NC) connected on an energizing line to the closing-sided relay, and a normally open terminal (NO) connected to the energizing line of the close-sided relay at a side opposite to the second common terminal wherein, by an operation instructing for opening the opening-and-closing member, switching is made from an energization enabled state that the second common terminal conducts with the normally closed terminal to thereby form an energizing line to the closing-sided relay into an energization disabled state of the closing-sided relay that the second common terminal conducts with the normally open terminal to thereby short-circuit between high-potential and low-potential ends of a drive coil of the closing-sided relay;
  wherein arrangement is made such that, in addition to the closing signal terminal (MU) and the first common terminal (COMA) as well as the opening signal terminal (MD) and the first common terminal (COMA), the normally closed terminal (NC) and the first common terminal (COMA), the normally closed terminal (NC) and the normally open terminal (NO), the normally closed terminal (NC) and the second common terminal (COMS), the normally open terminal (NO) and the first common terminal (COMA), the normally open terminal (NO) and the second common terminal (COMS), and the first common terminal (COMA) and the second common terminal (COMS) are not in adjacent relationships.

In such a form, by an operation instructing for opening the opening-and-closing member, provided is an energization disabled state that the drive coil of the closing sided relay is short-circuited between its high-potential and low-potential ends (state impossible to drive the closing-sided relay). Because only the opening-sided relay is positively driven, the operation for opening the opening-and-closing member can be made with reliability even during a water flood. Namely, it is possible to avoid an occurrence of the foregoing failure mode 4 that results from driving both the relays by the control function for preventing the leak current or malfunction during a water flood.

Moreover, in this case, the arrangement of the switch terminals as in the above prevents the foregoing failure mode from occurring should a conductive foreign matter is put between the adjacent ones. This is because, with the control device configured as in the above, the combination of terminals to possibly cause any of faulty modes is as the showing in FIG. 6A. Incidentally, the numerals in FIG. 6 correspond to the kinds of the failure modes possible to occur. Accordingly, with the above arrangement not having such a combination in adjacent relationship, even in the event of an occurrence of short-circuit between adjacent terminals, it is possible to avoid all the faulty modes 1–4 mentioned above.

Incidentally, the foregoing terminal arrangement preferably includes a concrete example in a form of arrangement in an order of the COMS, the MD, the NO, the AD, the COMA, the AU, the NC and MU or in an order reverse to that.

Next, an opening-and-closing control device of a second invention is an opening-and-closing member control device having a contact for opening and closing an energizing line to a motor for driving an opening-and-closing member in a vehicle, to have two relays for operating the motor in a direction toward opening or closing the opening-and-closing member during operation, a switch to be operated by a manipulation of a vehicular user, and a control circuit for driving any of the relays depending upon an operation state of the switch, the opening-and-closing member control device wherein, the switch comprises:
a ground-sided common terminal (COMA) connected to a ground;
a power-source-sided common terminal (COMB) connected to a high potential end of the power line;
a closing signal terminal (MU) to be conducted to the power-source-sided common terminal by an operation instructing for closing the opening-and-closing member and turned from the ground potential into a plus potential;
an opening signal terminal (MD) to be conducted to the power-source-sided common terminal by an operation instructing for opening the opening-and-closing member and turned from the ground potential into a plus potential;
an auto-closing signal terminal (AU) to be conducted to the ground-sided common terminal by an operation instructing for auto-full-closing operation of the opening-and-closing member and turned from a plus potential into a ground potential; and
an auto-opening signal terminal (AD) to be conducted to the ground-sided common terminal by an operation instructing for auto-full-opening operation of the opening-and-closing member and turned from the plus potential into the ground potential;
the control circuit has functions of:
driving the closing-sided relay when the closing signal terminal is at a plus potential, and driving the opening-sided relay when the opening signal terminal is at a plus potential;
continuously driving the closing-sided relay until the opening-and-closing member is detected as in a full closed state or a foreign-matter-catching state when the closing signal terminal becomes a plus potential and the auto closing signal terminal becomes the ground potential; and continuously driving the open-sided relay until the opening-and-closing member is detected as in a full opened state when the opening signal terminal becomes a plus potential and the auto opening signal terminal becomes the ground potential;
wherein arrangement is made such that the closing signal terminal (MU) and the power-source-sided common terminal (COMB), the closing signal terminal (MU) and the auto-closing signal terminal (AU), the closing signal terminal (MU) and the auto-opening signal terminal (AD), the opening signal terminal (MD) and the power-source-sided common terminal (COMB), the opening signal terminal (MD) and the auto-closing signal terminal (AU), the opening signal terminal (MD) and the auto opening signal terminal (AD), and the power-source-sided common terminal (COMB) and the ground-sided common terminal (COMA) are not in adjacent relationships.

According to the invention, what is called manual operation and auto operation is possible for the opening-and-closing member. Furthermore, should a conductive foreign matter is put between the adjacent ones of the terminals of the switch or the conductors in conduction to these, the foregoing faulty modes do not occur. This is because, in the control device having the above configuration, the combination of terminals having a possibility to cause any of the failure modes is as in the showing of FIG. 6B. Accordingly, in case arrangement is made with such a combination of terminals not in an adjacent relationship, the foregoing failure modes 1–4 can be avoided from occurring even in the event of an occurrence of short-circuit at between adjacent terminals.

Incidentally, the foregoing terminal arrangement is preferably, as a concrete example, in a form that the arrangement is in an order of the COMA, the MD, the AD, the AD, the COMB, the AU and the MU or in an order reverse to that, and further the interval of the MD and AU and the AU and MU is set with a spacing not causing a short-circuit due to a foreign matter (such lowered insulation as a cause of the foregoing failure mode). Incidentally, the arrangement order of terminals is not limited to that, e.g. the order may be the COMA, the MU, the AU, the COMB, the AD and the MD or reverse to that. Also, herein "the spacing not causing a short-circuit due to a foreign matter" is, concretely, a spacing of equal to or greater than 1.5 mm. For example, in the case the terminals are arranged at a pitch of approximately 2.6 mm, the interval of connecting lands is approximately 0.6 mm. Accordingly, there is a need to secure an interval that the amount corresponding to one terminal is thinned out or to have an adjacent terminal having a possibility to cause a failure mode.

BRIEF DESCRIPTION OF THE DRAWINGS

FIGS. 6a, 6b—is a figure showing a combination of adjacent terminals possible to cause a failure.

DESCRIPTION OF THE PREFERRED EMBODIMENTS

Embodiments of the present invention will now be explained on the basis of the drawings.
(First Embodiment)

Figure 1:
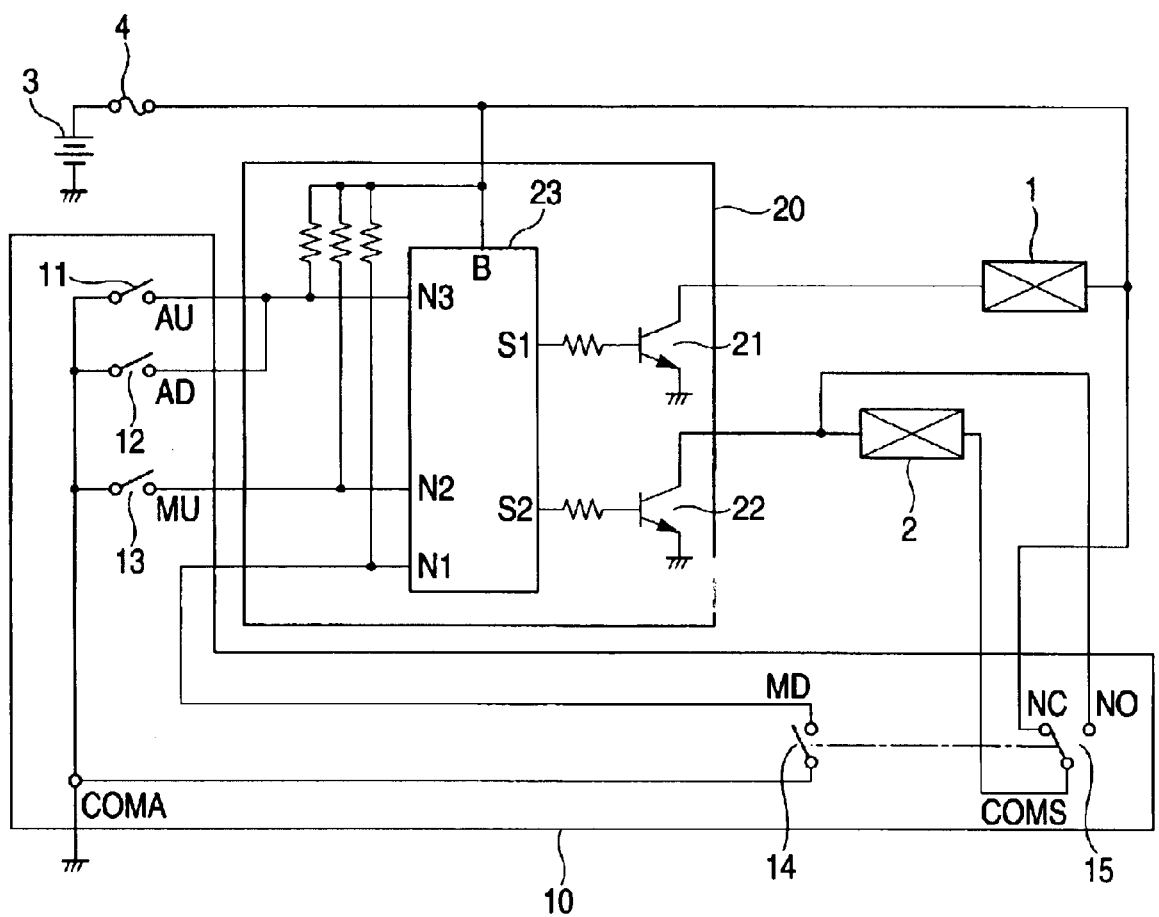
FIG. 1 is a circuit diagram showing an essential part configuration of a control device in a first embodiment of the present invention.
Figure 2A:
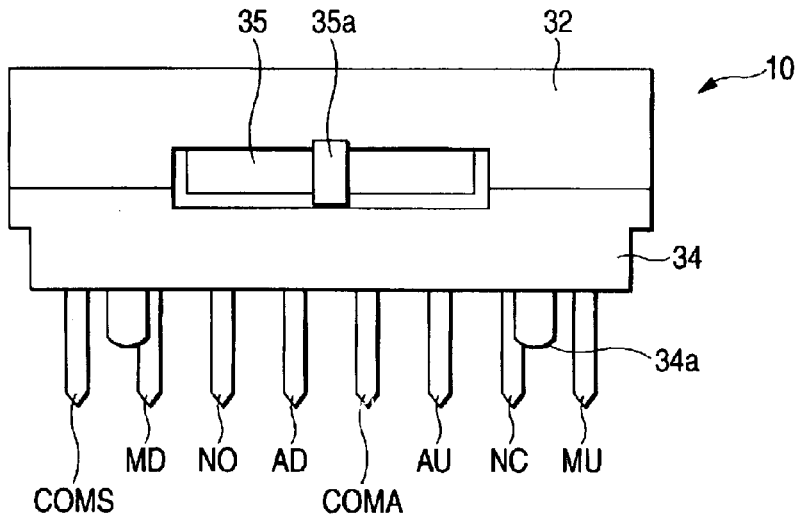
FIGS. 2a, 2b, 2c—is a view showing an external appearance of the same device.
Figure 2B:
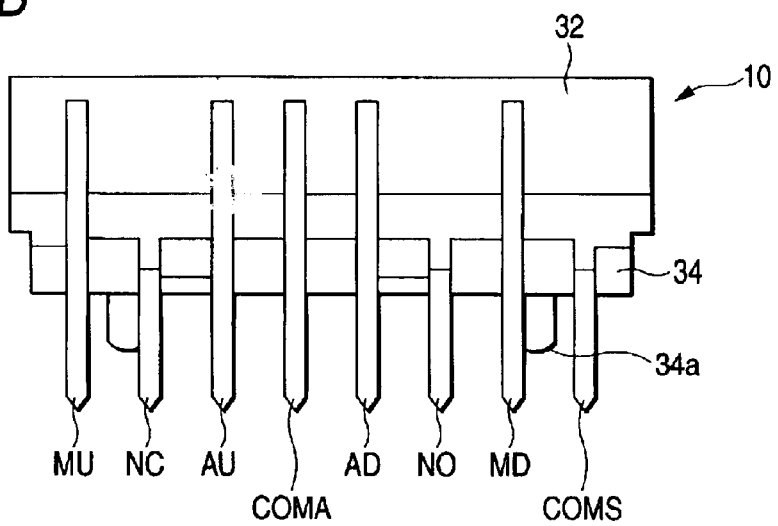
Figure 2C:
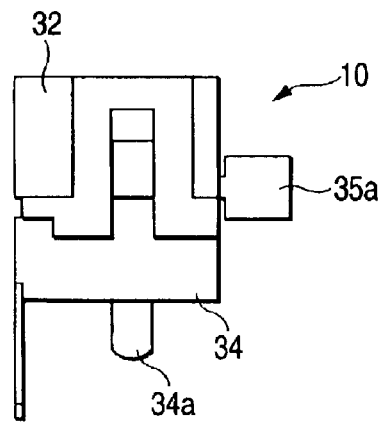
Figure 3A:
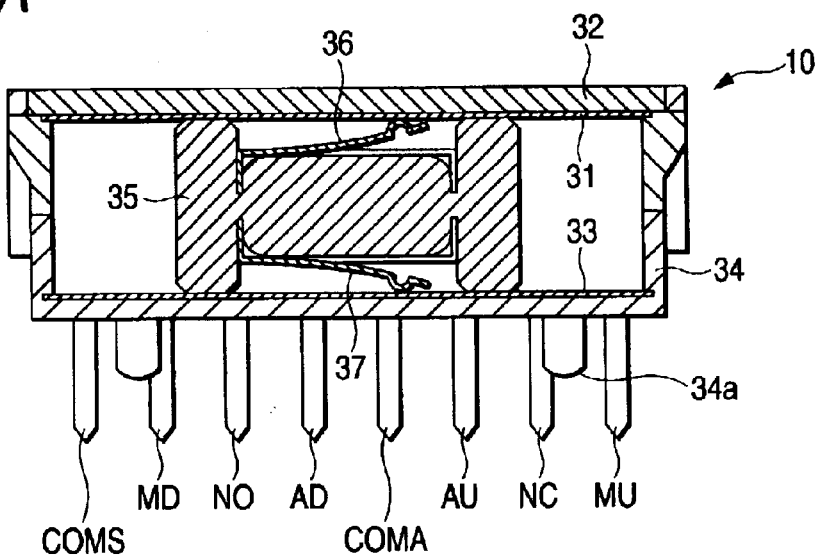
FIGS. 3a, 3b, 3c—is a view showing a structure and function of the same device.
Figure 3B:
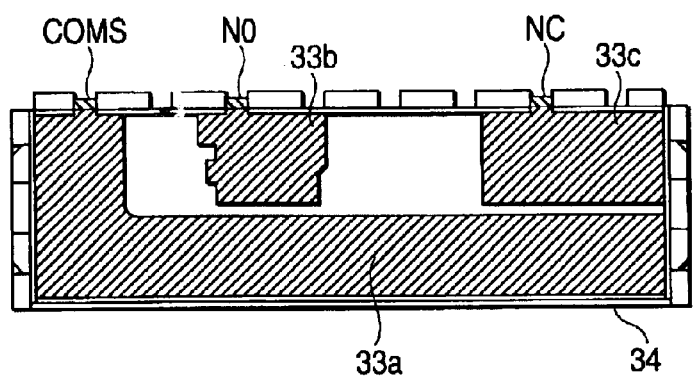
Figure 3C:
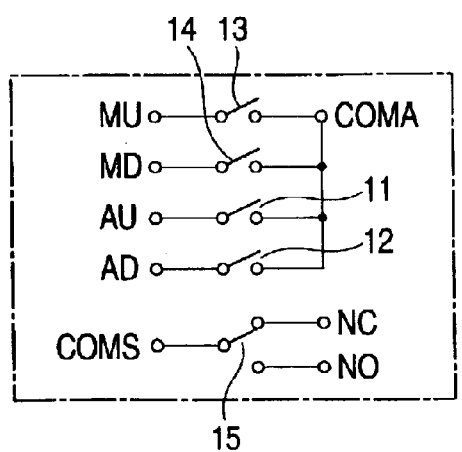

Now a first embodiment is explained. FIG. 1 is a diagram showing a main circuit configuration of a power window control device (essential part related to controlling a driver's seat window having auto operating function) of this embodiment. FIG. 2 is an external view of a switch of the same device (FIG. 2A is a front view, FIG. 2B is a rear view and FIG. 2C is a side view). Meanwhile, FIG. 3 is a figure explaining the structure and function of the same switch (FIG. 3A is a vertical sectional view, FIG. 3B is a horizontal sectional view and FIG. 3C is an internal circuit diagram).

The control device of this embodiment is to be provided for a vehicular window having an auto operating function (e.g. driver's seat window). This has two relays (not shown except for relay coils 1, 2) to be connected to a window-driving motor (not shown) as mentioned before. Furthermore, as shown in FIG. 1, there are provided a switch 10 having an internal contact to turn on depending upon the operation of a window operating part, and a control circuit 20 for drive-control the relay coils 1, 2 (driving coils) responsive to a terminal voltage (operation signal) of the switch 10. Note that the element shown at reference 3 in FIG. 1 is a vehicular battery while that shown at reference 4 is a fuse. Meanwhile, FIG. 1 shows the outline of circuit configuration, omittedly showing a power source circuit that converts an output voltage (e.g. 12V) of the battery 3 in the control circuit 20 and generates a predetermined power voltage (e.g. 5V), a switch that operates the other seat windows (assistant driver's seat or rear seat) from the drivers seat, and the like.

The switch 10 is a quite small-sized switch module, as hereinafter referred, having a plurality of contacts (in the narrow sense, switches) therein. In this case, there are provided four contacts 11, 12, 13, 14 that are what is called a-contacts (normally open contacts) and one contact 15 which is a c-contact (normally open contact and normally close contact). The switch 10 has, as external connection terminal, a first common terminal (COMA) having one terminals made common of the contacts 11–14, an auto closing signal terminal (AU) as the other terminal (output terminal) of the contact 11, an auto opening signal terminal (AD) as the other terminal of the contact 12, a closing signal terminal (MU) as the other terminal of the contact 13, an opening signal terminal (MD) as the other terminal of the contact 14, a second common terminal (COMS) as a common terminal of the contact 15, a normally close terminal (NC) of the contact 15 and a normally open terminal (NO) of the contact 15.

In case the operating part provided at the driver's seat (e.g. operation knob for driver's seat window) is operated a predetermined amount in a direction instructing to open the window, the contact 14 and the contact 15 synchronously turn on. Then, when the operating part is further operated exceeding the predetermined amount toward opening, the contact 12 is also turned on. Meanwhile, the operating part provided at the driver's seat is operated a predetermined amount in a direction instructing to close the window, the contact 13 is turned on. Then, when the operating part is further operated exceeding the predetermined amount toward closure, the contact 11 is also turned on.

Meanwhile, the control circuit 20 is configured as a hybrid IC (HIC), for example. This has a transistor 21 connected to a ground-sided energizing line of the opening-sided relay coil 1, a transistor 22 connected to a ground-sided energizing line of the closing-sided relay coil 2, and a processing circuit 23 configuring a microcomputer.

The processing circuit 23, when its input terminal N1 is at ground potential, drives the opening-sided relay coil 1. When the input terminal N2 is at ground potential, it drives the close-sided relay coil 2. In case the input terminal N1 and input terminal N3 is at ground terminal, even if this voltage change returns to the former, the opening-sided relay coil 1 is continuously driven until detecting a full open state of the driver's seat window. When the input terminal N2 and input terminal N3 becomes a ground potential, even if the voltage change returns to the former, the closing-sided relay coil 2 is continuously driven until detecting that the window is in a full open state or foreign-matter catching state. Thus, the control circuit 20 has a control function (i.e. auto-operation control function).

Herein, the COMA is connected to the ground. Also, the MD and the MU, in this case, are applied by a power voltage (e.g. 5V) through a resistance in the control circuit 20, which are separately connected to the respective input terminals N1, N2 of the processing circuit 23. The AU and the AD, in this case, are connected to each other within the control circuit 20, which are applied by the power voltage (e.g. 5V) and connected to the input terminal N3 of the processing circuit 23. The COMS and the NC are connected to a high-potential energizing line of the closing-sided relay coil 2. The NO is connected to the ground-sided energizing line of the close-sided relay coil 2. When the contact 15 operates to turn on the NO, the both terminals of the relay coil 2 are placed in a short-circuit state (energization disabled state to the relay coil 2) through the COMS and NO.

In this circuit configuration, in case the operating part is operated toward opening to turn on the contact 14, the MD conducts with the COMA. The potential on the MD (voltage at terminal N1) changes from a plus potential to a ground potential. The processing circuit 23 reads this out and determines for the operation. As a result, the processing circuit 23 turns on the opening-sided transistor 21 only and energizes the relay coil 1, thereby operating (manually operating) the motor in the opening direction. On this occasion, the contact 15 is simultaneously turned on and the relay coil 2 is placed in an energization disabled state the relay coil 2 is short-circuited at its both ends. Accordingly, even in the event of a current leak caused by a water flood or the like, the relay coil 1 only can be positively driven to open the window. Also, even where there is provided a control function to detect a water flood and forcibly drive both the relays thereby preventing the failure the motor unintentionally operates during a water flood, the operation of the operating part toward opening can positively realize a window opening by the action of the contact 15. In this connection, in case a configuration is simple with having such a short-circuit operation, in the case a leak current occurs from the ground-sided terminal of the relay coil 2 toward the ground line, there is a fear that, even if the operating part is operated toward opening, both the relay coils 1, 2 are placed in a driven state (state both the two relays operate and the both terminal of the motor are connected to the high-potential power line) resulting in a failure that the motor does not operate in any of the directions (failure mode 4 noted before).

Next, when the operating part is further operated toward opening and the contacts 14 and 12 turn on, the AD is placed in conduction with the COMA. The potential on the AD (voltage at terminal N3) becomes the ground potential. The processing circuit 23 reads this out and determines for the operation. As a result, the processing circuit 23 holds the opening-sided transistor 21 until the full open is reached. Thus, the motor is operated (auto operated) to the full-open position.

On the other hand, in case the operating part is operated toward closing and the contact 13 is turned on, the MU is placed in conduction with the COMA. The voltage at MU (voltage at terminal N2) becomes the ground potential. The processing circuit 23 reads this out and turns on only the closing-sided transistor 22, thereby energizing the relay coil 2. Thus, the motor is operated (manually operated) toward closure. On this occasion, because the contact 15 is turned off and the relay coil 2 is in an energization enabled state its both ends are not short-circuited, only the relay coil 2 can be driven to close the window.

Meanwhile, when the operating part is further operated toward closure and the contacts 13 and 11 turn on, the AU is placed in conduction with the COMA. The voltage on the AU (voltage at terminal N3) becomes the ground potential. The processing circuit 23 reads this out and holds the closing-sided transistor 22 on until a full-open or foreign-matter catching state is reached. Thus, the motor is operated (auto operated) to the full-close or foreign-matter catching state.

Now, the structure of the switch 10 is explained with reference to FIGS. 2 and 3.

The switch 10 is quite small in size having a lateral length of approximately 2 cm. As shown in FIG. 3A, this is made up with an upper case 32 made of a synthetic resin insert-molding a conductor member 31 structuring the fixing ends of contacts 11–14 and their terminals (COMA, AU, AD, MU, MD), a lower case 34 formed of a synthetic resin insert-molding a conductor member 33 structuring the fixing end of contact 15 and its terminals (COMS, NC, NO), a slider 35 made of synthetic resin slidably accommodated in the cases, a conductor member 36 attached on the upper surface of the slider 35 and structuring the movable ends of contacts 11–14, and a conductor member 37 attached on the underside surface of the slider 35 and structuring the movable end of contact 15. Incidentally, the element shown by reference 34a in FIG. 3A and the like is a projection (for positioning during board mounting) formed in the underside surface (mounting surface) of the lower case 4. Herein, the slider 35 is formed with an urge part 35a projecting outward of the case front (see FIG. 2C, etc.). In case the operating part for driver's seat window provided at the driver's seat is operated, the urge part 35a is pressed to move the slider 35 left/right in FIG. 3A.

Meanwhile, from the conductor members 31, 33, narrow strips (0.8 mm in width) of connection ends extend, as terminals (COMA, AU, AD, MU, MD) or terminals (COMS, NC, NO), downward from each backside of the case, as shown in FIG. 2. These are arranged in one line at a slight spacing (1.8 mm), in a state projecting downward of the underside surface of the lower case (in a state for insertion in the through-holes of the board). The one-line arrangement facilitates to mount it onto the board, and arranges/simplifies in order the conductor patterns, etc. on the board, enabling to reduce the board size.

Incidentally, the conductor members 31, 33 are separated on each terminal basis. By switching the contact state to the conductor member 36, 37 moving together with the slider 35, the structure realizes the foregoing function by the contacts 11–14 or contact 15. For example, the lower conductor member 33 is divided with three conductors 33a, 33b, 33c, as shown in FIG. 3B. Among these, the conductor 33a is in one body with the COMS, the conductor 33b is with the NO, and the conductor 33c is with the NC. In a neutral state the operating part is not in operation or in an operating state toward closure the slider 35 and conductor member 37 is to move rightward in FIG. 3A, the conductor member 37 is in contact with only the conductors 33a and 33c, thus placing the COMS and NC in a conduction state. On the other hand, in the operating state toward opening the slider 35 and conductor member 37 is to move leftward in FIG. 3A, the conductor member 37 is in contact with only the conductors 33a and 33b, thereby placing the COMS and NO in a conduction state.

The terminal arrangement of the switch 10 is made with such a setting that the MU and the COMA, the MD and the COMA, the NC and the COMA, the NC and the NO, the NC and the COMS, the NO and the COMA, the NO and the COMS and the COMA and COMS are not in adjacent relationship.

In this case, concretely, the CMOS, the MD, the NO, the AD, the COMA, the AU, the NC and the MU are arranged at a constant pitch (2.6 mm) in this order or in the order reverse to that, as shown in FIG. 2A, etc.

Accordingly, should a conductive foreign matter be put between the adjacent ones of the terminals of the switch 10 and the conductors in conduction to these (e.g. terminal-connecting lands on the board), the foregoing faulty modes 1–4 do not occur. This is because, with the control device having the above configuration, the combination of terminals possibly cause any of faulty modes is as the showing in FIG. 6A, as described before. Accordingly, with the above arrangement not having an adjacent-relational combination, even in the event short-circuit occurs at between the adjacent ones of terminals, it is possible to avoid all the foregoing faulty modes 1–4. This can eliminates the necessity of the foregoing secondary working or the like, thus enabling to reduce the cost.

(Second Embodiment)

Figure 4:
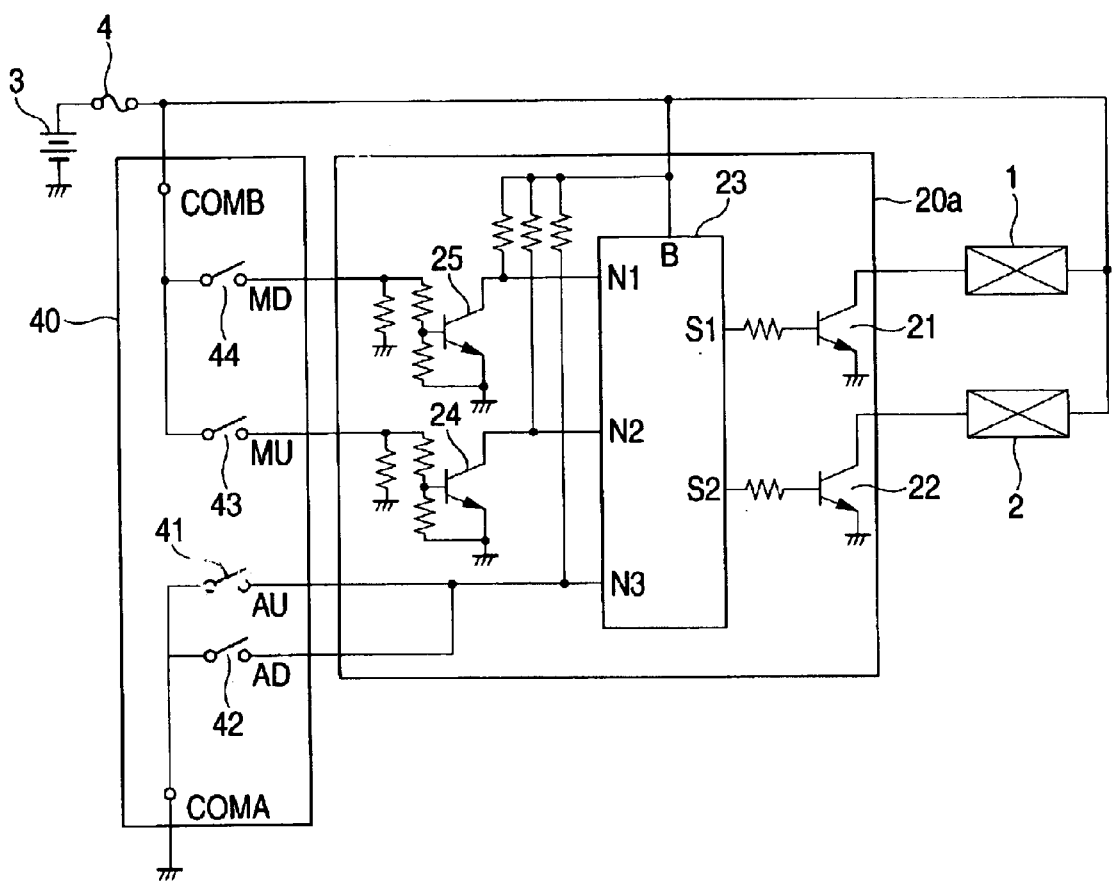
FIG. 4 is a circuit diagram showing an essential part configuration of a control device in a second embodiment of the invention.
Figure 5A:
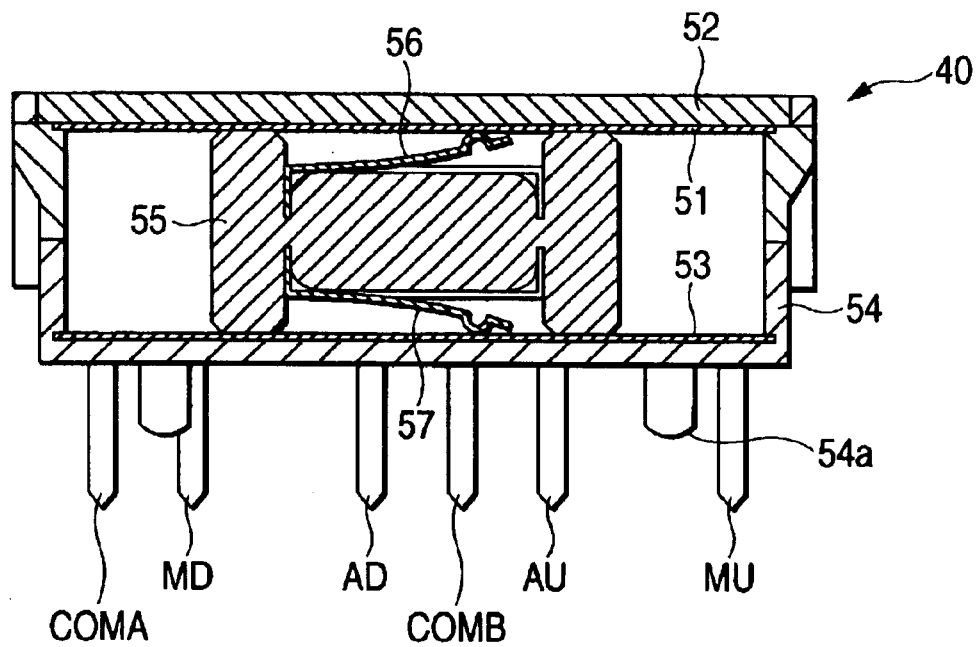
FIGS. 5a, 5b—is a view showing a structure and function of the same device.
Figure 5B:
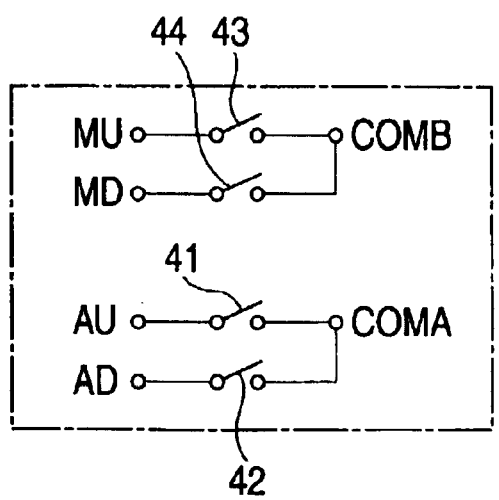

Now, a second embodiment is explained. FIG. 4 is a diagram showing a main circuit configuration of a power window control device (essential part related to controlling a driver's seat window having auto operating function) of this embodiment. FIG. 5 is a figure explaining the structure and function of a switch of the same device (FIG. 5A is a vertical sectional view while FIG. 5B is an internal circuit diagram). Incidentally, the corresponding elements to those of the first embodiment (FIG. 1, etc.) use the same references, to omit the explanation.

The control device of this embodiment, as shown in FIG. 4, does not have a contact for short-circuiting the relay coil (i.e. not having a water-flood compatible specification) but has a switch 40 of a type that a high voltage (output voltage of battery 3) is applied to the common of the contact for manual operation.

The switch 40, in this case, has four contacts 41–44 that are normally open contacts. There are provided, as external-connection terminals, a ground-sided common terminal (COMA) having one terminal made common of the contacts 41, 42 and connected to a ground, a power-source-sided common terminal (COMB) having one terminal made common of the contacts 43, 43 and connected to a high-potential power line (positive pole end of battery 3), an auto-closing signal terminal (AU) that is the other terminal (output terminal) of the contact 41, an auto-opening signal terminal (AD) that is the other terminal contact 42, a closing signal terminal (MU) that is the other terminal of contact 43, and an opening signal terminal (MD) that is the other terminal of the contact 44.

Meanwhile, the control circuit 20a of this embodiment has transistors 24, 25 respectively connected between the MU or MD and the ground. When the contact 43 or 44 turns on, the transistor 24 or 25 turns on, thereby structurally switching the voltage at the input terminal N1 or N2 of the processing circuit 23 from a plus potential to a ground potential. Incidentally, the AU and the AD in this embodiment are mutually connected in the control circuit 20 similarly to the first embodiment (FIG. 1), which is applied by a power voltage (e.g. 5V) and connected to the input terminal N3 of the processing circuit 23.

In this circuit configuration, in case the operating part is operated toward opening and turns on the contact 44, the MD is placed conduction with the COMB. The voltage at the input terminal N1 changes to a ground potential. The processing circuit 23 reads this out and turns on only the opening-sided transistor 21. Consequently, the motor is operated (manually operated) toward opening. Then, when the operating part is further operated toward opening and turns on the contacts 44 and 42, the AD is placed in conduction with the COMA and the input terminal N3 also becomes a ground potential. The processing circuit 23 reads this out and keeps the transistor 21 on until full open is reached. Accordingly, the motor is operated (auto-operated) to the full open position. This is true for the operation toward closure.

Now, the structure of the switch 40 is explained with reference to FIG. 5.

The switch 40 is similar in basic structure to the switch 10 of the first embodiment. This comprises, as shown in FIG. 5A, an upper case 52 formed of a synthetic resin insert-molding a conductor member 51 structuring the fixing ends of contacts 43, 44 and their terminals (COMB, MU, MD), a lower case 54 formed of a synthetic resin insert-molding a conductor member 53 structuring the fixing ends of contacts 41, 42 and their terminals (COMA, AU, AD), a slider 55 formed of a synthetic resin slidably accommodated in these cases (urge part not shown), a conductor member 56 attached on the upper surface of the slider 55 and structuring the movable ends of the contacts 43, 44, and a conductor member 57 attached on the lower surface of the slider 55 and structuring the movable end of the contacts 41, 42. Incidentally, the reference 54a is a projection formed in the underside surface of the lower case 54.

Meanwhile, from the conductor member 51, 53, narrow strips of connection end extend, as terminals (COMB, MU, MD) or terminals (COMA, AU, AD), downward of each backside of the case. These are arranged in one line in a state projecting downward of the underside surface of the lower case 54.

The terminal arrangement of the switch 40 is made in such a setting that the MU and the COMB, the MU and the AU, the MU and the AD, the MD and the COMB, the MD and the AU, the MD and the AD, and the COMB and the COMA are not in adjacent relationship in a spacing having a fear to cause a failure due to a foreign matter.

In this case, as shown in FIG. 5A, specifically the COMA, the MD, the AD, the COMB, the AU and the MU are arranged in the order or in the order reverse to that, wherein the MD and the AD, and the AU and the MU are arranged at a pitch of every other. The spacing is given with a sufficient dimensions (terminal-to-terminal spacing: 4.4 mm, land-to-land spacing: 3.2 mm) not to cause failure due to a foreign matter.

Accordingly, should a conductive foreign matter is put between the adjacent ones of the terminals of the switch 40 or the conductors in conduction to these, there foregoing faulty modes do not occur. This is because, with the control device having the above configuration, the combination of terminals possibly to cause any of failure modes is as the showing in FIG. 6B, as mentioned before. Accordingly, the present device, such adjacent-relational combination is not provided at a narrow spacing, can avoid all the faulty modes.

(Other Embodiments)

Incidentally, the present invention is not limited to the embodiment explained above but can include various forms of embodiments.

For example, the first embodiment may be in a structure deleted of the contact 15 for short-circuiting the relay coil. Also, the second embodiment may have a contact for short-circuiting the relay coil similar to the first embodiment.

Meanwhile, the contact for short-circuiting the relay coil of the first embodiment was structured by providing the both ends of relay coil with ground-end potential, the both ends of the relay may be both at power-end potential.

As already described, in the second embodiment, terminal arrangement may be in the order of the COMA, the MU, the AU, the COMB, the AD and the MD or in the order reverse to that.

Although the foregoing two embodiments are of the low-sided drive type that has a transistor, for drive, to a ground end of the relay coil, a high-sided drive type is applicable that is provided with a transistor in a position opposite to that.

Meanwhile, the invention may be applied to a control section for the driver's seat window usually provided with auto-operation function or to a control section for a window at other than the driver's seat or vehicular other opening/closing members (e.g. sun roof).

In addition, the terminals of the switch of the invention must not be arranged in a straight line form. For example, they may be in a staggered form. Otherwise, they may be arranged in two rows configuring what is called dual-in-line package.

According to an opening-and-closing member control device of the present invention, should a foreign matter is put to between the adjacent ones of the terminals of the switch or the conductors in conduction to those, there is no occurrence of the foregoing failure modes. This can eliminates the necessity of the foregoing secondary working or the like, thus enabling to reduce the cost.

What is claimed is:

1. An opening-and-closing member control device having a contact for opening and closing an energizing line to a motor for driving an opening-and-closing member in a vehicle, to have two relays for operating the motor in a direction toward opening or closing the opening-and-closing member during operation, a switch to be operated by a manipulation of a vehicular user, and a control circuit for driving any of the relays depending upon an operation state of the switch, the opening-and-closing member control device wherein, the switch comprises:
a first common terminal connected to a ground;
a closing signal terminal to be conducted to the first common terminal by an operation instructing for closing the opening-and-closing member and turned from a plus potential into a ground potential;
an opening signal terminal to be conducted to the first common terminal by an operation instructing for opening the opening-and-closing member and turned from a plus potential into the ground potential;

an auto-closing signal terminal to be conducted to the first common terminal by an operation instructing for auto-full-closing operation of the opening-and-closing member and turned from a plus potential into the ground potential; and an auto-opening signal terminal to be conducted to the first common terminal by an operation instructing for auto-full-opening operation of the opening-and-closing member and turned from a plus potential into the ground potential;

the control circuit has functions of:

driving a closing-sided relay when the closing signal terminal is at the ground potential, and driving an opening-sided relay when the opening signal terminal is at the ground potential;

continuously driving the closing-sided relay until the opening-and-closing member is detected as in a full closed state or a foreign-matter-catching state when the closing signal terminal and the auto closing signal terminal become the ground potential; and continuously driving the open-sided relay until the opening-and-closing member is detected as in a full opened state when the opening signal terminal and the auto opening signal terminal become the ground potential;

wherein arrangement is made such that the closing signal terminal and the first common terminal as well as the opening signal terminal and the first common terminal are not in adjacent relationships.

2. An opening-and-closing member control device according to claim 1, wherein the switch further comprises a second common terminal and normally closed terminal connected on an energizing line to the closing-sided relay, and a normally open terminal connected to the energizing line of the close-sided relay at a side opposite to the second common terminal wherein, by an operation instructing for opening the opening-and-closing member, switching is made from an energization enabled state that the second common terminal conducts with the normally closed terminal to thereby form an energizing line to the closing-sided relay into an energization disabled state of the closing-sided relay that the second common terminal conducts with the normally open terminal to thereby short-circuit between high-potential and low-potential ends of a drive coil of the closing-sided relay;

wherein arrangement is made such that, in addition to the closing signal terminal and the first common terminal as well as the opening signal terminal and the first common terminal, the normally closed terminal and the first common terminal, the normally closed terminal and the normally open terminal, the normally closed terminal and the second common terminal, the normally open terminal and the first common terminal, the normally open terminal and the second common terminal, and the first common terminal and the second common terminal are not in adjacent relationships.

3. An opening-and-closing member control device according to claim 2, wherein the terminals of the switch are arranged in an order of the second common terminal, the opening signal terminal, the normally open terminal, the auto-opening signal terminal, the first common terminal, the auto-closing signal terminal, the normally closed terminal and the closing signal terminal or in an order reverse to that.

4. An opening-and-closing member control device having a contact for opening and closing an energizing line to a motor for driving an opening-and-closing member in a vehicle, to have two relays for operating the motor in a direction toward opening or closing the opening-and-closing member during operation, a switch to be operated by a manipulation of a vehicular user, and a control circuit for driving any of the relays depending upon an operation state of the switch, the opening-and-closing member control device wherein, the switch comprises:

a ground-sided common terminal connected to a ground;

a power-source-sided common terminal connected to a high potential end of the power line;

a closing signal terminal to be conducted to the power-source-sided common terminal by an operation instructing for closing the opening-and-closing member and turned from the ground potential into a plus potential;

an opening signal terminal to be conducted to the power-source-sided common terminal by an operation instructing for opening the opening-and-closing member and turned from a ground potential into a plus potential;

an auto-closing signal terminal to be conducted to the ground-sided common terminal by an operation instructing for auto-full-closing operation of the opening-and-closing member and turned from a plus potential into the ground potential; and an auto-opening signal terminal to be conducted to the ground-sided common terminal by an operation instructing for auto-full-opening operation of the opening-and-closing member and turned from the plus potential into the ground potential;

the control circuit has functions of:

driving the closing-sided relay when the closing signal terminal is at the plus potential, and driving the opening-sided relay when the opening signal terminal is at a plus potential;

continuously driving the closing-sided relay until the opening-and-closing member is detected as in a full closed state or a foreign-matter-catching state when the closing signal terminal becomes a plus potential and the auto closing signal terminal becomes the ground potential; and continuously driving the open-sided relay until the opening-and-closing member is detected as in a full opened state when the opening signal terminal becomes a plus potential and the auto opening signal terminal becomes the ground potential;

wherein arrangement is made such that the closing signal terminal and the power-source-sided common terminal, the closing signal terminal and the auto-closing signal terminal, the closing signal terminal and the auto-opening signal terminal, the opening signal terminal and the power-source-sided common terminal, the opening signal terminal and the auto-closing signal terminal, the opening signal terminal and the auto opening signal terminal, and the power-source-sided common terminal and the ground-sided common terminal are not in adjacent relationships.

5. An opening-and-closing member control device according to claim 4, wherein the terminals of the switch are arranged in an order of the ground-sided common terminal, an opening signal terminal, the auto-opening signal terminal, the power-source-sided common terminal, the auto-closing signal terminal and the closing signal terminal or in an order reverse to that.

* * * * *